United States Patent [19]

Schmidt et al.

[11] Patent Number: 5,339,103

[45] Date of Patent: Aug. 16, 1994

[54] PART MACHINING PROGRAMMING USING A CAMERA INTERCHANGEABLE WITH MACHING NOZZLE

[76] Inventors: Robert H. Schmidt, 16820 Creek Ridge Trail, Minnetonka, Minn. 55345; Dan Martin, 4328 Aldrich Ave. S., Minneapolis, Minn. 55409

[21] Appl. No.: 931,599

[22] Filed: Aug. 18, 1992

[51] Int. Cl.⁵ .............................................. H04N 7/18
[52] U.S. Cl. ................................... 348/95; 901/3; 901/5; 901/47; 395/94; 318/568.13; 348/119
[58] Field of Search ................... 358/101, 107, 93; 901/2, 3, 6, 47, 5; 395/94; 318/568.12, 568.13

[56] References Cited

U.S. PATENT DOCUMENTS

| | | | |
|---|---|---|---|
| 3,809,308 | 5/1974 | Roeder | 228/9 |
| 4,443,855 | 4/1984 | Bishop | 358/107 |
| 4,555,610 | 11/1985 | Polad et al. | 219/121 LA |
| 4,568,971 | 2/1986 | Alzmann | 358/101 |
| 4,831,316 | 5/1989 | Ishiguro | 901/47 |
| 4,831,548 | 5/1989 | Matoba | 901/47 |
| 4,837,487 | 6/1989 | Kurakake et al. | 318/568.16 |
| 4,891,767 | 2/1990 | Rzasa | 901/2 |
| 5,052,338 | 10/1991 | Maiorca | 358/107 |
| 5,159,745 | 11/1992 | Kato | 29/407 |

*Primary Examiner*—Tommy P. Chin
*Assistant Examiner*—Bryan S. Tung
*Attorney, Agent, or Firm*—Faegre & Benson

[57] ABSTRACT

A system and method for using a camera and an associated display means for facilitating the loading of the distinguishing characteristics of a workpiece into the control system for a machining system to allow machining of workpieces in accordance with a stored program.

9 Claims, 2 Drawing Sheets

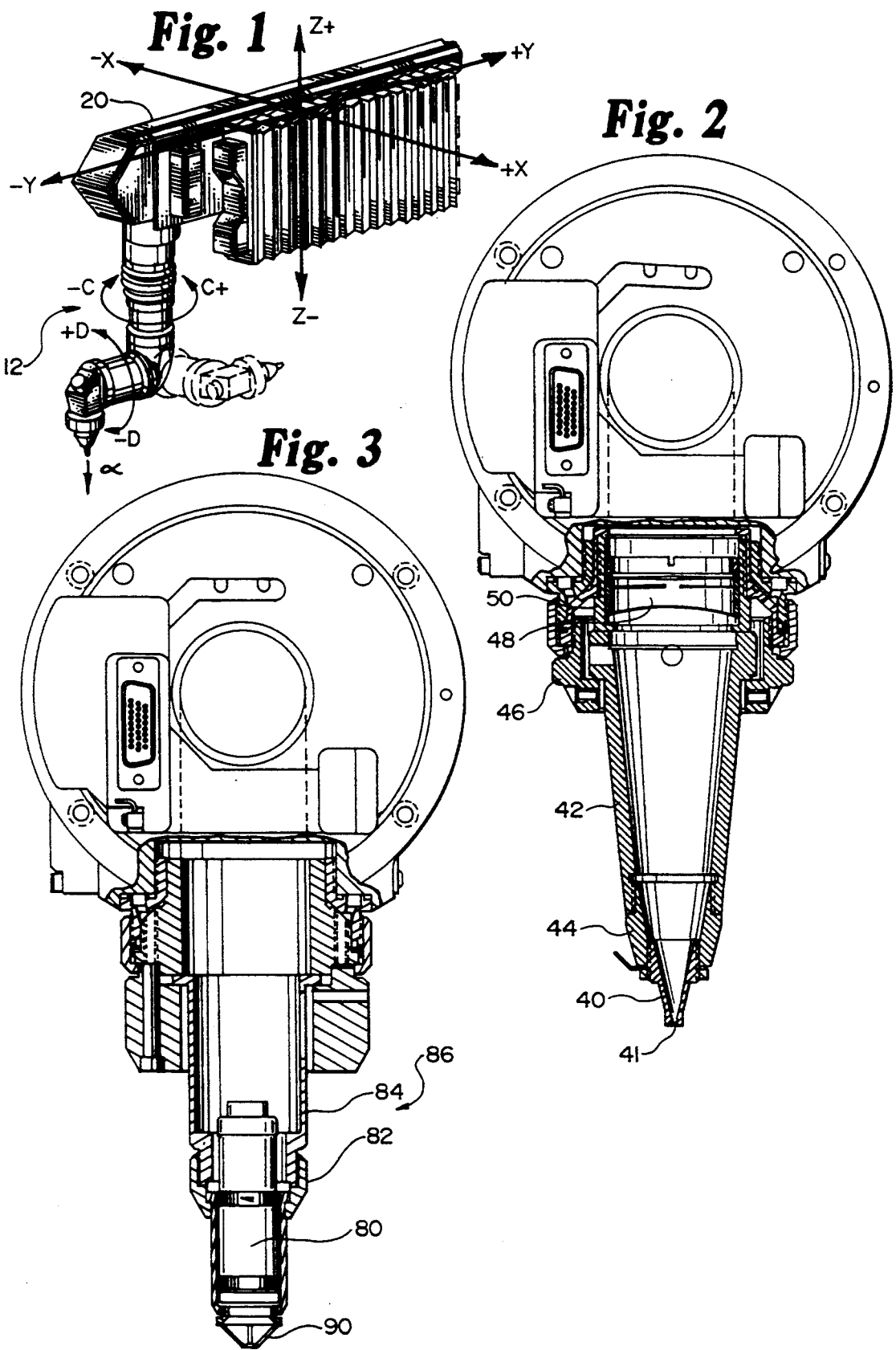

PART MACHINING PROGRAMMING USING A CAMERA INTERCHANGEABLE WITH MACHING NOZZLE

BACKGROUND OF THE INVENTION

One of the primary methods presently known for generating programs for multi-axis machining systems is to "teach" the machine the program by moving a machining head such as a laser beam cutting nozzle around the desired path (usually a line scribed on a master part, referred to as a scribe line). Points or positions along the scribe line are entered or "taught" by entering their coordinates into the controller and are then stored. These points form the basis for the part machining program that commands the machine to move around the workpiece and perform machining operations at locations along the taught path. After the coordinates of interest are taught to the program, the program is then edited to enter additional information such as feed rates and laser parameters to complete the workpiece program.

Such a method of generating a program for machining a workpiece (generally referred to as "teaching") requires that the machine be positioned very accurately over the scribe line as each point is entered. There are a number of methods used to achieve this accurate positioning. Currently, three methods are primarily used: (1) use of the laser beam at low power, (2) use of a collinear HeNe laser, or (3) use of a probe tip.

Each of these three current methods has shortcomings. Using the laser beam at low power exposes the operator to potentially hazardous laser radiation. The HeNe laser focusses at a different spot than the $CO_2$ laser beam used for machining and is difficult to align. Probe tips are inaccurate and are prone to damage.

FIELD OF THE INVENTION

The program teaching system of the present invention utilizes a camera, a display screen with a cross-hair target, and appropriate software to allow the operator to "jog" the processing head of the machine along axes oriented to the axes of the crosshairs on the display regardless of the camera orientation. This provides a simplified way for the operator to accurately orient the machine and thereby to align the cross-hairs to the scribe line image.

To "teach" the machining program to the processing machine with the system according to the present invention, the operator installs the camera assembly on the machine in place of the machining nozzle, jogs to the machine to a start point on the workpiece, and begins to enter the coordinates of taught points along the scribed path. The cross-hairs on the display indicate where the processing beam will strike the workpiece during processing. The crosshairs are aligned on the target point on the part indicating that the laser processing machine is in the proper position to record the coordinates and "teach" that point to the system.

The offset distance (displacement from the surface) to the processing head is maintained at a constant distance by the automatic focus control of the system to facilitate alignment of the focal point of the laser beam with a designed location on the workpiece surface. Suitable automatic focus control systems for laser machining systems are commercially available in the Laserdyne AFC, available from Lumonics Corporation of Eden Prairie, Corporation.

SUMMARY OF THE INVENTION

This invention relates to a novel method for programming a machining system to perform operations on a workpiece surface. The present novel programming system is based on the use of a camera image to provide a readily-determinable orientation of the machine and to allow the machine to record the space coordinates where machining operations are to occur.

The present invention provides a method for creating a part machining program for a three dimensional processing machine for a workpiece. The three dimensional processing machine positions a multiaxis processing head, which carries an attached machining nozzle to various points along a path indicated by a scribe line applied to a master workpiece to teach the machine's controller to follow a taught path through a plurality of points, the coordinates of which are entered into the machine controller and stored to form the basis for a workpiece machining program for con, handing the machining nozzle to move along the taught path and for performing machining operations at specified points in accordance with further instructions inserted into the workpiece machining program.

The present novel programming method comprises the following steps. A camera assembly is mounted on multi-axis processing head with the camera aligned for forming an image of the portion of the workpiece surface immediately beneath the machining nozzle carried by the processing head. A display means, connected to the camera for receiving the image formed by the camera, is monitored and a crosshair reference point displayed on the display means is used to define the point where a beam passing through the nozzle would strike the workpiece. The processing head is moved to align the crosshairs of the display means with multiple points along the scribed line and to store the coordinates of the translational and rotational axes corresponding to each of the points.

The present invention also provides an improved three dimensional processing machine for processing a workpiece wherein the machine is taught a workpiece machining program for commanding a machining nozzle mounted on a multi-axis processing head to move along a taught path over the surface of a master workpiece to allow storage of machine coordinates for each such point thereby allowing the teaching of the machine to follow a desired path over the workpiece surface.

The improvement for facilitating this teaching comprises the following features. A camera mounted on the multi-axis processing head, so that, during teaching of the three dimensional processing machine, the camera is mounted adjacent the end of the C axis of the head and aligned with the position of a beam passing through the nozzle for providing a camera image of the portion of the surface of the workpiece axially adjacent to the nozzle. A computing means is operatively coupled to the camera for receiving image information from the camera and providing output image information. The computing means also includes means for generating an image of a pair of orthogonal crosshairs. The crosshairs are superimposed with the image of the surface of the workpiece positioned below the nozzle with the intersection of the crosshairs positioned at the point on the workpiece upon which the focal point of the beam passing through the nozzle impinges. Display means are constructed and arranged for receiving output image information from the computing means.

BRIEF DESCRIPTION OF THE DRAWINGS

FIG. 1 illustrates a perspective view of a three dimensional workpiece processing machine according to the present invention with a camera mounted on the multi-axis processing head;

FIG. 2 is a view of the processing head portion of the beam positioner with the cutting nozzle in place viewed along the D axis with the depending nozzle portion shown in cross section;

FIG. 3 is a view of the processing head portion of the same portion of the beam positioner shown in FIG. 2 with the machining nozzle removed and the teaching camera in place and FIG. 4 is a block diagram of the teaching system.

DETAILED DESCRIPTION OF THE INVENTION

Figure 4:
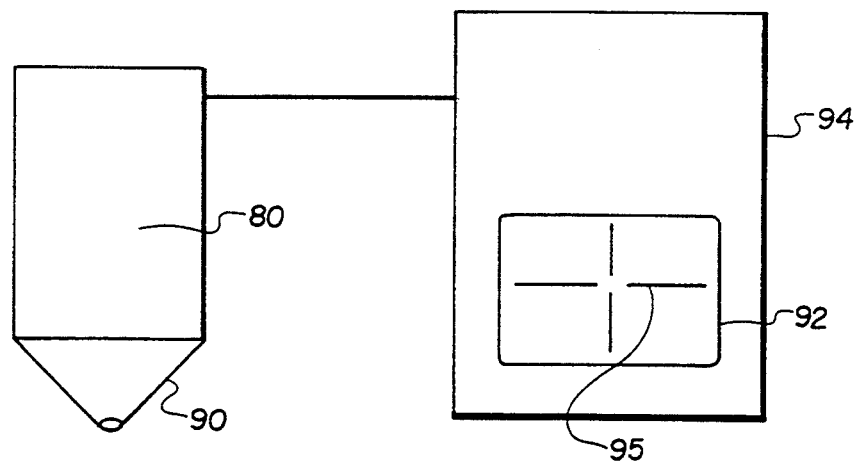

As illustrated in FIG. 1, a beam positioner device 12 is mounted at the end of a y-axis ram 20 of three dimensional processing machine which, in the preferred embodiment of the invention shown herein is a laser machining system as shown in U.S. Pat. 4,555,610, assigned to the assignee of the present invention. Laser machining systems such as the Lumonics/Laserdyne System 94 CNC which include such beam positioners are commercially available from the Laserdyne Division of applicant's assignee.

Beam positioner device 12 rotates the axis of the machining laser beam around rotational axes C and D as illustrated in FIG. 1. The beam positioner 12 as shown in phantom outline has been rotated by 90 degrees about the C and D axes from the position shown in solid lines.

FIG. 2 shows additional detail for the processing head portion of the beam positioner. A machining nozzle 40 is suspended from a nozzle holder 42 but insulated therefrom by an insulating portion 44. The machining nozzle is adapted for delivering the focussed laser beam through an axial aperture 41 which also serves to apply processing gases to the region of the workpiece upon which the beam impinges. A connector 46 is used to secure nozzle holder 42 in a proper axially aligned relationship to the beam focussing lens 48 which is, in turn mounted in a housing 50 which is positioned above and in contact with the top of nozzle holder 42.

Nozzle holder 42 and lens 48 are mounted, in their housing, using resiliently releasable restraining means for permitting some degree of "lost motion" movement of the nozzle 40 relative to the remainder of the processing head to protect the system in the event that nozzle 40 strikes the workpiece. Additionally the nozzle 40 and lens 48 are removable with their mounting structures, as a unit, from the remainder of the processing head.

FIG. 3 shows the processing head with the machining nozzle 40 and lens 48 removed and a camera assembly substituted for it. A video camera 80 is mechanically connected, using a connector 82 to the body 84 of the camera mounting assembly 86 which is in turn mounted on the beam positioner following removal of the machining lens and nozzle assembly. Camera 80 has its optical axis aligned with the beam axis of the beam positioner so that camera 80 can focus on the portion of the workpiece surrounding the point where the laser beam axis strikes it. A suitable camera 80 is a model IKM30A available from Toshiba. As was the case with the nozzle assembly illustrated in FIG. 2, the teaching assembly is constructed to allow the camera and the support body to move relative to the remainder of the positioner in the event that the camera comes into contact with the workpiece as the camera is being moved.

A nozzle 90 is connected to the camera housing. Nozzle 90 has similar capacitance characteristics to the machining nozzle 40 of the machining head assembly so that it can be connected into gap sensing circuitry to facilitate operation of the CNC in an automatic focus control mode as disclosed more completely in our co-pending application entitled Automatic Control of Laser Beam Tool Positioning, filed Aug. 14, 1992 as Ser. No. 07/929,942, which is incorporated herein by reference. In order to accomplish the teaching of the part machining program, it is also necessary that the CNC have the ability to automatically and continuously determine the normal vector to the part surface of the workpiece for each point of interest. Such a feature is also disclosed in the above identified copending application and incorporated herein by reference.

The camera assembly has a length extension corresponding to the machining head assembly so that the camera nozzle 90 corresponds substantially to the positioning of machining nozzle 40 when the machining assembly is mounted on the processing head. It is then possible to use camera nozzle tip 90 as one plate of a capacitive sensor, the other plate of which is the surface of the workpiece; and have the output signal equivalent to the signal developed using the machining nozzle drive of the servo control of the system.

The camera and machining nozzle assemblies are constructed and arranged for quick interchange to allow quick changing between the "teach" configuration and the machining configuration. In operation it should be possible to accomplish the changeover in a matter of seconds. The camera is oriented so that the image produced on a display 92 shown in FIG. 4 is in a known relationship with respect to the C and D machine axes.

In the preferred form of the invention as shown herein, the display means 92 is mounted on a portable "teach" pendant station 94, that is, on a control box that is separate from but in operable relationship with the controls normally used for operating the automatic machining system. In the preferred embodiment, the cross-hairs 95 of the display 92 are generated electronically and are adjustable to allow for proper alignment of the camera axis to the laser beam axis. Such displays are commonly available.

Because the camera is mounted on the D axis, the image produced by the camera translates and/or rotates as the beam positioner is moved. A software feature of the present invention rotates the x, y and z axis jog of the beam positioner commands so that x axis control movements always cause the image to translate horizontally (and y axis commands results in vertical movement) irrespective of the positions of the C and D axes, to match the horizontal and vertical axes represented by the cross-hairs on the display screen. This translation is made by the software, which notes the known positions of the C and D axes along with the known orientation of the camera to the D axis and calculates a translation factor. This factor is applied to all axes, when the appropriate control mode is activated, so that any jog of the beam positioner in the X direction moves the machine head in such a way that the image on the display 92 will move horizontally. Similarly, moves along the Y axis result in vertical moves on the display screen. In this way, the operator does not need to make any separate difficult mental transformations to jog the beam positioner in the proper direction to align it with a desired target point.

A suitable laser machining nozzle is required for delivery of the machining laser beam and suitable processing gases in order to assure proper operation of the machine control system. The nozzle is designed and adapted so that the camera can be suitably positioned so as to allow the scribe line to be clearly viewed while the machine is operating in the teaching mode. Suitable means for illuminating the target area of the workpiece may also be provided to conveniently assure the provision of clear camera images.

Having disclosed the presently preferred embodiment of the invention, many modifications and variations thereof will be obvious to those skilled in the art, and accordingly, the invention is intended to be limited only by the attached claims.

What is claimed is:

1. In a method for creating a part machining program for a three dimensional processing machine for a workpiece in which the machine positions a multi-axis processing head which carries an attached machining nozzle to various points along a path indicated by a scribe line applied to a master workpiece to teach a machine controller to follow a taught path through a plurality of points, the coordinates of which are entered into the machine controller and stored to form the basis for a part machining program for commanding the machining nozzle to move along the taught path and for performing machining operations at specified points in accordance with further instructions inserted into the part machining program, an improved method of teaching comprising the steps of:

(a) mounting a camera assembly on the processing head with the camera aligned for forming an image of the portion of the workpiece surface immediately beneath the nozzle;

(b) monitoring a display means connected for receiving the image formed by the camera and using a displayed crosshair reference point to define the point where a beam passing through the nozzle would strike the workpiece; and (c) moving the processing head to align the crosshairs of the display means with multiple points along the scribed line and storing the coordinates of the translational and rotational axes corresponding to each of the points.

2. The method of claim 1 wherein the machine controller is used during the teaching process for maintaining a constant distance offset between the workpiece surface and the nozzle as the machine program teaching process is carried out.

3. The method of claim 1 wherein the two orthogonal rotational axes of the multi-axis laser processing head are adjusted by the machine controller for orienting the axis of the nozzle to align the axis normal to the surface of the workpiece at each teaching point prior to teaching the machining program the coordinates of the three translational and two rotational axes for points located along the scribed line on the master workpiece.

4. In a three dimensional processing machine for processing a workpiece wherein the machine is taught a part machining program for commanding a machining nozzle carrying a multi-axis processing head to move along a taught path to various points along a scribe line applied to a master workpiece to allow storage of machine coordinates for each such point thereby teaching the machine to follow a desired machine path through a plurality of such points, improved apparatus for facilitating the teaching comprising, in combination:

(a) a camera assembly including a camera nozzle and a camera coupled to the nozzle for producing an image therethrough, said assembly constructed and arranged for mounting on the processing head interchangeably with the machining nozzle for teaching the machine a part machining program for a particular workpiece, said camera assembly when mounted having the optical axis of the camera when viewing the workpiece through the camera nozzle oriented coincidentally with the beam axis of a beam passing through the machining nozzle for providing a camera image of the portion of the surface of the workpiece which would be axially adjacent to the machining nozzle during machining operations; and (b) display means operatively coupled to the camera and constructed and arranged for receiving camera image information from the camera, said display means also including means for providing an image of a pair of orthogonal crosshairs, said crosshairs being superimposed with the image of the surface of the workpiece positioned below the nozzle camera with the intersection of the crosshairs positioned at the point on the workpiece upon which the beam passing through the nozzle impinges.

5. The invention of claim 4, wherein X and Y axis operator actuated controller means are provided for moving the processing head over the surface of the workpiece.

6. The invention of claim 4 wherein the camera assembly includes a lost motion mounting means allowing the camera to undergo limited movement relative to the processing head in the event that the camera or camera nozzle comes into contact with the workpiece during the teaching operation.

7. The system of claim 4, wherein the processing machine includes automatic gap control means for moving a camera nozzle which is used during the teaching process for maintaining a constant distance offset between the part surface and the nozzle as the machine program teaching process is carried out.

8. The system of claim 4 wherein automatic gap control means senses the capacitance between the nozzle and the workpiece and the capacitance characteristics of the machining and camera nozzles are equivalent.

9. The system of claim 4, wherein two rotational axes of the multi-axis processing head are adjusted by automatic control means of the processing machine for orienting the axis of the nozzle so that it is normal to the workpiece surface prior to teaching the machining program the coordinates of the three translational and two rotational axes for each of the multiple points along the scribed machining path on the master workpiece.

* * * * *

UNITED STATES PATENT AND TRADEMARK OFFICE
CERTIFICATE OF CORRECTION

PATENT NO. : 5,339,103

DATED : August 16, 1994

INVENTOR(S) : Schmidt et al.

It is certified that error appears in the above-identified patent and that said Letters Patent is hereby corrected as shown below:

Column 2, line 22, delete "con, handing" and insert --commanding--

Signed and Sealed this

Eighth Day of November, 1994

Attest:

BRUCE LEHMAN

Attesting Officer

Commissioner of Patents and Trademarks